United States Patent [19]

Wanzor

[11] Patent Number: 4,749,162

[45] Date of Patent: Jun. 7, 1988

[54] FISHING ROD HOLDER CUP INSERT MEMBER

[76] Inventor: Frank Wanzor, 104 Mooney Pond Rd., Selden, N.Y. 11784

[21] Appl. No.: 43,365

[22] Filed: Apr. 28, 1987

[51] Int. Cl.$^4$ ................................................ A47K 1/08
[52] U.S. Cl. ...................... 248/558; 248/310; 248/311.2; 248/DIG. 11; 114/364; 220/85 H
[58] Field of Search ............... 248/558, 511, 514, 515, 248/518, 519, 535, 102, 103, 106, 126, 128, 152, 178, 213.2, 174, 309.1, 310, 311.2, 314, 360, DIG. 11; 403/3, 4, 160; 43/21.2; 224/922, 148; 114/364; 220/85 H, 903

[56] References Cited

U.S. PATENT DOCUMENTS

| | | | |
|---|---|---|---|
| 1,223,884 | 4/1917 | Johnstone | 248/314 |
| 1,389,594 | 9/1921 | Moore | 220/85 H |
| 1,883,508 | 10/1932 | Bonday | 248/314 |
| 2,749,067 | 6/1956 | Gorenflo | 248/511 |
| 2,952,432 | 9/1960 | Valdez | 248/538 |
| 3,010,687 | 11/1961 | Hagberg | 248/314 |
| 3,881,269 | 5/1975 | Timmons | 248/314 |
| 4,040,549 | 8/1977 | Sadler | 248/311.2 |
| 4,062,299 | 12/1977 | Smith | 114/364 |
| 4,093,171 | 6/1978 | Mengo | 248/314 |
| 4,548,348 | 10/1985 | Clements | 220/85 H |

FOREIGN PATENT DOCUMENTS 2542567 4/1977 Fed. Rep. of Germany ... 248/85 H

Primary Examiner—J. Franklin Foss
Assistant Examiner—Robert A. Olson
Attorney, Agent, or Firm—Michael I. Kroll

[57] ABSTRACT

A fishing rod holder cup insert member is provided that can hold drinks without spilling or falling over. The cup can be removed therefrom and used by itself as a regular drinking cup if so desired.

3 Claims, 1 Drawing Sheet

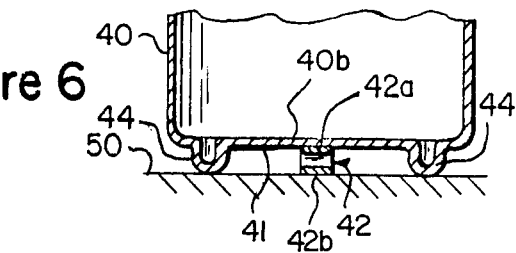
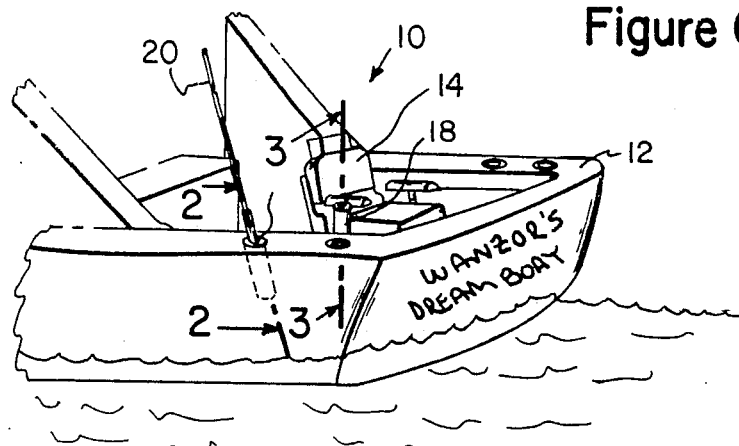
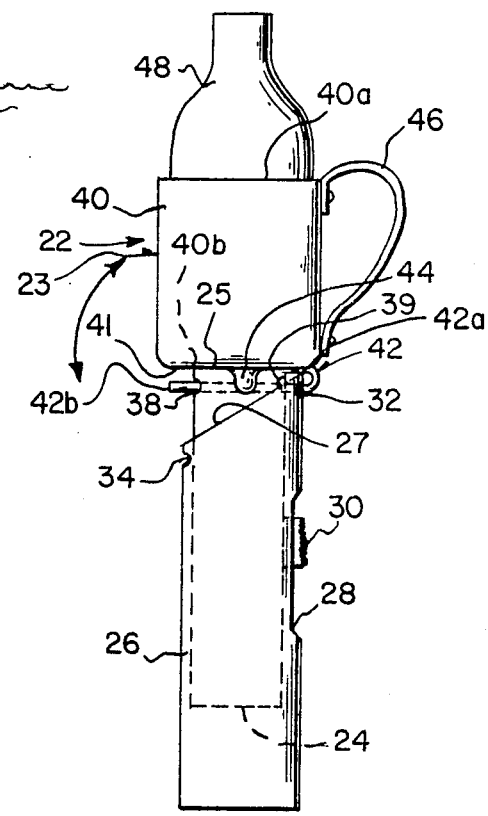
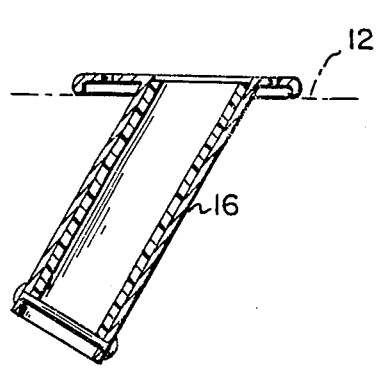
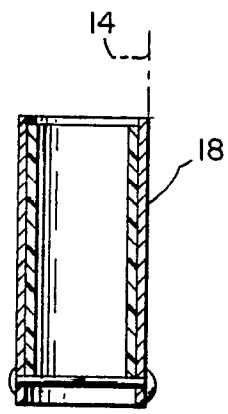
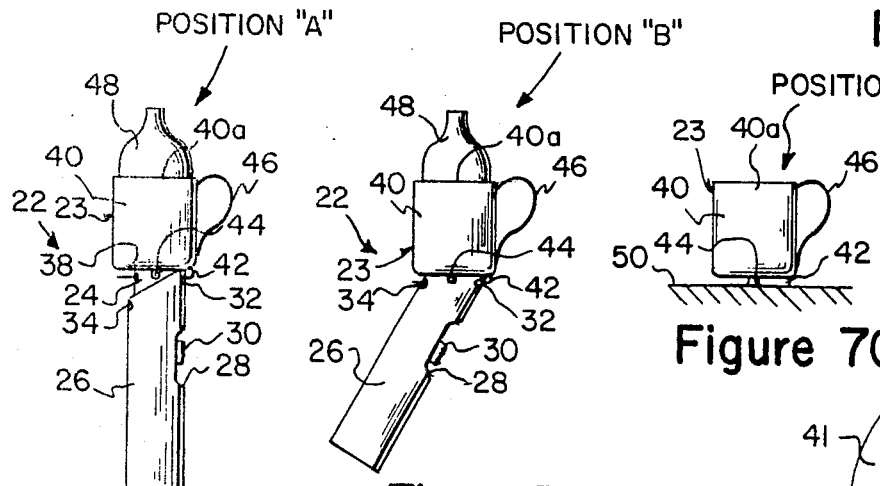
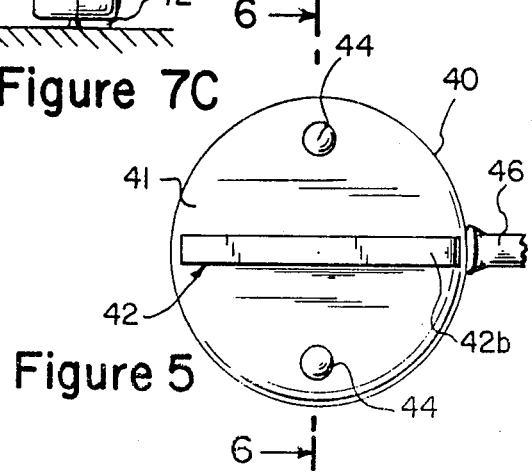

FISHING ROD HOLDER CUP INSERT MEMBER

BACKGROUND OF THE INVENTION

1. Field of the Invention

The instant invention relates generally to support devices and more specifically it relates to a fishing rod holder cup insert member.

2. Description of the Prior Art

Numerous support devices have been provided in prior art that are adapted to hold fishing rods and the like in secured positions. For example, U.S. Pat. Nos. 1,223,884; 1,883,508; 3,010,687; 3,881,269 and 4,093,171 all are illustrative of such prior art. While these units may be suitable for the particular purpose to which they address, they would not be as suitable for the purposes of the present invention as heretofore described.

SUMMARY OF THE INVENTION

A primary object of the present invention is to provide a fishing rod holder cup insert member that will overcome the shortcomings of the prior art devices.

Another object is to provide a fishing rod holder cup insert member that can hold drinks without spilling or falling over.

An additional object is to provide a fishing rod holder cup insert member whereby the cup can be removed therefrom and used by itself as a regular drinking cup if so desired.

A further object is to provide a fishing rod holder cup insert member that is simple and easy to use.

A still further object is to provide a fishing rod holder cup insert member that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the stern of a boat showing gunwale fishing rod holders and a fighting chair fishing rod holder therein.

FIG. 2 is an enlarged cross sectional view taken along line 2—2 in FIG. 1, through one of the gunwale fishing rod holders.

FIG. 3 is an enlarged cross sectional view taken along line 3—3 in FIG. 1, through the fighting chair fishing rod holder.

FIG. 4 is a side view of the invention.

FIG. 5 is a bottom view of the cup.

FIG. 6 is a cross sectional view with parts broken away taken along line 6—6 in FIG. 5.

FIG. 7A is a side view of the invention in a position "A" to be used in the gunwale fishing rod holder.

FIG. 7B is a side view of the invention in a position "B" to be used in the fighting chair rod holder.

FIG. 7C is a side view of the cup in a position "C" to be used by itself.

DETAILED DESCRIPTION OF THE PREFERRED EMBODIMENTS

Turning now descriptively to the drawings, in which similar reference characters denote similar elements throughout the several views, FIG. 4 illustrates a fishing rod holder cup insert member 22 that contains a first sleeve 26 to fit within the fishing rod holder 16 or 18, a second sleeve 24 which slideably fits within the first sleeve 26, a container 23 for holding drinks and the like therein is removably connected to top of the first sleeve 26 and the second sleeve 24 whereby the fishing rod holder 16 or 18 will stabilize the container 23 and prevent the container from falling over and spilling out the drinks and the like therefrom.

The first sleeve 26 has a diagonal open top 27 and a pair of first apertures 32 and 34 spaced oppositely each other adjacent the diagonal open top 27 so that one of the first apertures 32 is at highest level of the diagonal open top 27 and other of the first apertures 34 is at lowest level of the diagonal open top. The second sleeve 24 has a flat open top 25 and a pair of second apertures 38 and 39 spaced oppositely each other adjacent the flat open top.

A J-shaped hook 42 is provided with a short arm 42a and a long arm 42b. The short arm 42a is affixed to underside 41 of the container 23 with the long arm 42b extending spaced away and parallel to the underside 41 of the container 23.

In a first position "A", as shown in FIG. 7A, the long arm 42b can extend through the highest first aperture 32 in the first sleeve 26 and through both of the second apertures 38 and 39 in the second sleeve 24 in which the first sleeve 26 can be inserted within the fishing rod holder 18, shown in FIGS. 1 and 3, for a fighting chair 14 of a fishing boat 10 thus keeping the container 23 in a vertical position.

In a second position "B", as shown in FIG. 7B, the long arm 42b can extend through the highest first aperture 32 in the first sleeve 26, through second aperture 39 in the second sleeve 24 and then through the lowest aperture 34 in the first sleeve 26 in which the first sleeve can be inserted within the fishing rod holder 16, shown in FIGS. 1 and 2, in a gunwale 12 of the fishing boat 10, thus keeping the container 23 in a vertical position.

The first sleeve 26 has recessed slot 28 while a finger slide 30 is affixed to side of the second sleeve 24. The finger slide 30 extends through the recessed slot 28 in the first sleeve 26 so that the second sleeve 24 can be manually moved within the first sleeve between the first position "A" and the second position "B" via the finger side 30.

As best seen in FIGS. 4, 5 and 6 the container 23 further includes a cylindrical housing 40 that has an open top 40a and a closed bottom 40b for holding a bottle 48 and liquids directly therein. A handle 46 is affixed to side of the housing 40 and a pair of spaced apart detents 44 extend downwardly from the underside 41 of the closed bottom 40b on either side of the J-shaped hook 42. In a third position "C" as shown in FIG. 7C, the container 23 can be used as an ordinary cup and be placed upon a flat surface 50 with the detents 44 stabilizing the housing 40.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A fishing rod holder cup insert member which comprises:
   (a) a first sleeve to fit within the fishing rod holder and having a recessed slot and a diagonal open top and a pair of first apertures spaced oppositely each other adjacent said diagonal open top so that one of said first apertures is of highest level of said diagonal open top and other of said first apertures is at lowest level of said diagonal open top;
   (b) a second sleeve to slidably fit within said first sleeve and having a flat open top and a pair of second apertures spaced oppositely each other adjacent said flat open top;
   (c) a container for holding drinks and the like therein; and
   (d) means for removably connecting said container to the top of said first sleeve and said second sleeve whereby the fishing rod holder will stabilize said container and prevent said container from falling over and spilling out the drinks and the like therefrom, said means including a J-shaped hook provided with a short arm and a long arm, the short arm affixed to an underside of said container with the long arm extending spaced away and parallel to the underside of said container so that in a first position the long arm can extend through the highest of said first apertures in said first sleeve and through both of the second apertures in said second sleeve in which said first sleeve can be inserted within the fishing rod holder for a fighting chair of a fishing boat thus keeping the container in a vertical position, and in a second position the long arm can extend through the highest of said first apertures in said first sleeve, through one of the second apertures of said second sleeve and then through the lowest of said first apertures in said first sleeve in which said first sleeve can be inserted within the fishing rod holder in a gunwale of the fishing boat thus keeping the container in a vertical position.

2. A fishing rod holder cup insert member as recited in claim 1, further comprising:
   (a) said first sleeve having a recessed slot; and
   (b) a finger slide affixed to side of said second sleeve and extending through said recessed slot in said first sleeve so that said second sleeve can be manually moved within said first sleeve between the first position and the second position via said finger slide.

3. A fishing rod holder cup insert member as recited in claim 2, wherein said container further comprises:
   (a) a cylindrical housing having an open top and closed bottom for holding a bottle and liquids directly therein;
   (b) a handle affixed to side of said housing; and
   (c) a pair of spaced apart detents extending downwardly from the underside of the closed bottom on either side of said J-shaped hook so that in a third position said container can be used as an ordinary cup and be placed upon a flat surface with said detents stabilizing said housing.

* * * * *